Jan. 6, 1970     W. K. TEMPLE     3,487,588

MACHINE TOOL CONTROL APPARATUS

Filed July 5, 1966     3 Sheets-Sheet 1

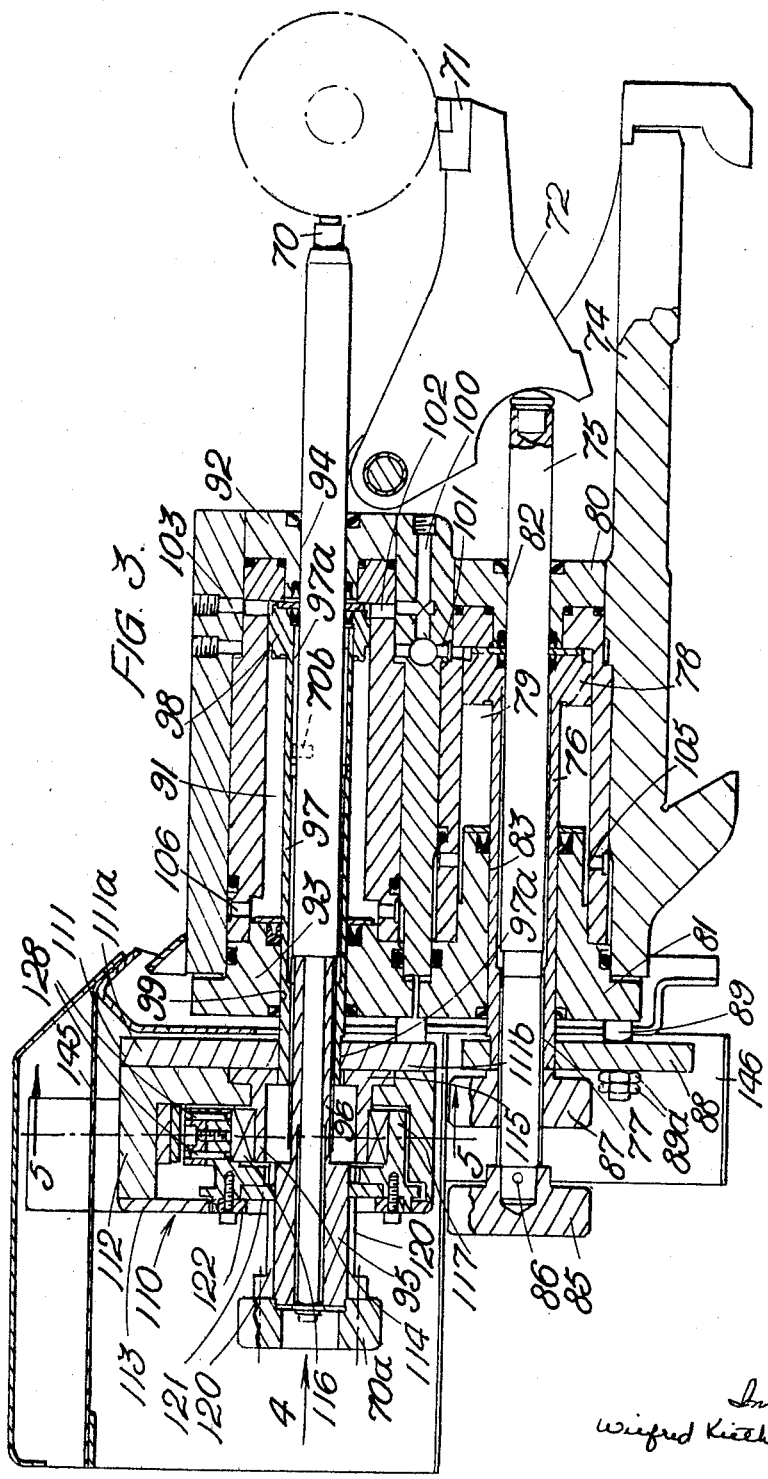

Jan. 6, 1970  W. K. TEMPLE  3,487,588
MACHINE TOOL CONTROL APPARATUS
Filed July 5, 1966  3 Sheets-Sheet 3
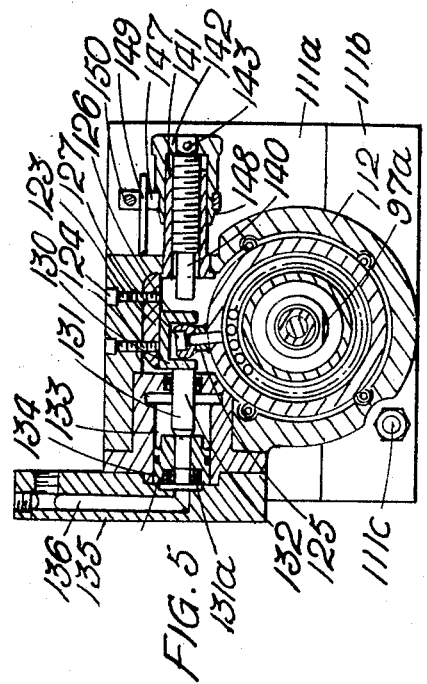
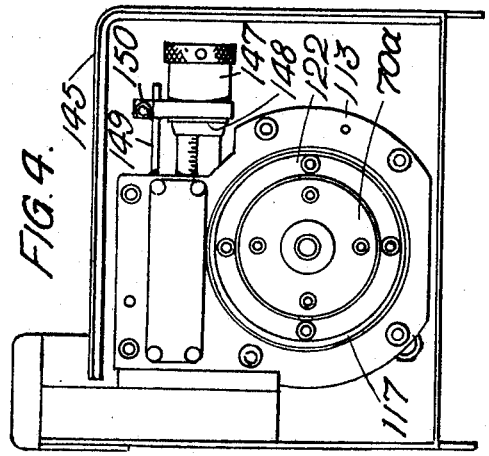
Inventor
Wilfred Keith Temple
Watson, Cole, Grindle + Watson
Attorneys

United States Patent Office 3,487,588
Patented Jan. 6, 1970

3,487,588
MACHINE TOOL CONTROL APPPARATUS
Wilfred Keith Temple, Peterborough, England, assignor to The Newall Engineering Company Limited, Peterborough, Northamptonshire, England, a British company
Filed July 5, 1966, Ser. No. 562,912
Claims priority, application Great Britain, May 2, 1966, 19,321/66
Int. Cl. B24b 49/04
U.S. Cl. 51—165  4 Claims

ABSTRACT OF THE DISCLOSURE

At least two gauges are provided in a plural tool machining apparatus for gauging at least two different portions of the workpiece to provide signals for actuating switch means controlling the workpiece feed means and to activate automatically adjustable workpiece steadying means.

---

This invention relates to machining apparatus and has a particularly useful application in grinding machines.

According to this invention in one aspect there is provided machining apparatus comprising a plurality of cutting tools fixed in relation to each other, a workpiece support, feed means for moving the tools and support relatively towards and away from each other, said tools being spaced apart in a direction transversely to the direction of the feed movement, two guages for respectively gauging two portions of a workpiece which portions are respectively to be machined by said tools, the gauges producing respective signals in response to the attainment of the portions to respective predetermined sizes, and switch means actuatable by both of said gauges and adapted to stop the feed means when one of the gauges gives a signal on attainment of the portion measured thereby to its predetermined size, and thereafter to actuate another operation of the feed means.

According to a preferred feature of the invention, the switch means is adapted to actuate another operation of the feed means when the other of the gauges signals the attainment of the portion measured thereby to its predetermined size.

According to another preferred feature of the invention, the switch means is adapted to actuate another operation a predetermined time interval after the signal from said one gauge.

In one preferred arrangement the switch means is adapted to actuate another operation of the feed means either when the other of the gauges signals the attainment of the portion measured thereby to its predetermined size or after the lapse of a predetermined time interval after the signal from said one gauge whichever occurs first.

According to another preferred feature of the invention, said other operation comprises re-starting the feed means to cause a forward feed movement, and there is provided steady means for steadying the workpiece at or adjacent at least one of said portions, and means for automatically adjusting the steady means a preselected distance towards said portion or portions on actuation of the switch means by the gauge or gauges.

The steady means may comprise a motor including co-acting piston and cylinder elements one of which elements is fixed and the other of which elements is movable towards and away from the workpiece support by fluid pressure applied within the cylinder element, a steadying finger mounted on said other element, and screw means interconnecting the finger and said other element for adjusting the position of the finger relative to the said other element in a direction towards and away from the workpiece.

Automatic means for operating the screw means may comprise a fixed cylinder, a piston mounted in the cylinder, and a socket member and a peg member connected one to the finger and the other to said other element, the construction and arrangement being such that pressure fluid supplied to the cylinder rotates the finger and said other element relative to each other.

According to the invention, there is provided apparatus for simultaneously machining, by means of respective tools which are fixed relative to each other, a plurality of portions of a workpiece carried on a support, the tools and the support being feedable relatively towards each other, and said portion being spaced apart in a direction transversely to the direction of the feed movement, which apparatus comprises means for feeding the support and tools towards each other until one of said portions is a predeterminde amount oversize, then stopping the feed movement and maintaining the support and the tools in the relative positions in which they are when said one portion becomes said predeterimned amount oversize either until another of said portions becomes the same amount oversize as said one portion or for a predetermined period, then continuing the feed movement. Preferably, after the pause in the feed movement, the continued feed movement is at a slower rate than before the pause.

One preferred apparatus in which at least one steady is applied to the opposite side of the workpiece to the tools before the feed movement is stopped and after the restarting of the feed movement comprises means for adjusting the steady towards the workpiece between the stopping and restarting of the feed movement.

One embodiment of the invention as applied in a grinding machine will now be described by way of example with reference to the accompanying drawings in which:

FIGURE 3 shows in axial section a steady for the grinding machine, FIGURE 4 shows the steady viewed in the direction of the arrow 4 in FIGURE 3, and FIGURE 5 shows a section on the line 5—5 of FIGURE 3.

Figure 1:
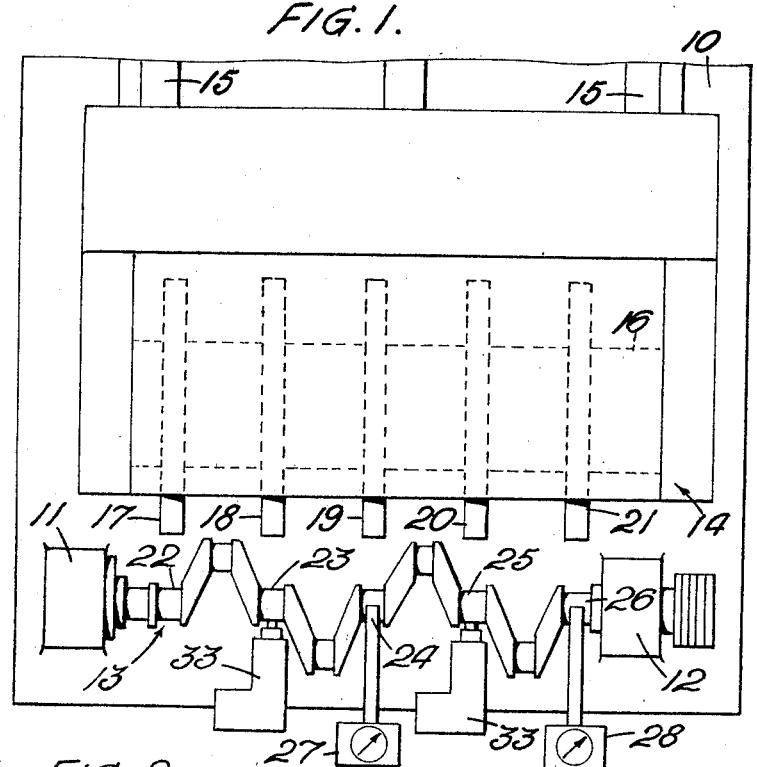
FIGURE 1 shows a grinding machine diagrammatically in plan.

Referring to the drawings, the grinding machine comprises a fixed base 10 having two supports 11, 12 in which the ends of a five-bearing crankshaft 13 constituting the workpiece are shown drivingly mounted, and a wheel head 14 which is mounted on a slide 15 on the base for sliding movement at right angles to the rotational axis of the crankshaft on the supports 11, 12. The wheel head carries a motor-driven shaft 16 on which five grinding wheels 17 to 21 are secured and which is disposed parallel to the axis of rotation of the workpiece. The grinding wheels are disposed at positions along the shaft corresponding to the positions at which the workpiece is to be ground, i.e. in this instance opposite the main journals 22 to 26 of the crankshaft. If desired, other grinding wheels may be provided for grinding at the same time other parts of the crankshaft which are coaxial with the main journals. The sizes of the various grinding wheels may differ, and they are arranged so that as the wheel head moves towards the workpiece supports, the various diameters on which the crankshaft is being ground come to their respective correct finished dimensions together. It is normal practice in high quality work for the wheel head to be fed in automatically and relatively rapidly to provide a coarse feed until the parts being ground are a predetermined amount oversize, then to reduce the speed of inward movement of the wheel head to provide a semi-fine feed until the parts are a very small predetermined amount oversize, and finally to reduce the feed speed even further to provide a fine feed. Hitherto, a single "in-process" gauge has been provided which controls the feed rate and initiates retraction of the wheel head when the finished size is reached. The gauge measures a diameter of the workpiece, at the point to which the gauge is applied, while the grinding is in process. However, when elongated complex components such as crankshafts are being ground to close tolerances, e.g. .0004", it is found that owing to minute distortions of the various parts of the machine and the workpiece under the grinding pressure, the various parts of the workpiece do not reach the correct size relationship at the same instant. For example, where a greater amount has to be ground off one part of the workpiece than off another part of the workpiece, the first part is often found to be a very small amount oversize when the other of the parts reaches its correct dimension.

In applying the present invention to this apparatus, two "in-process" gauges 27, 28 are applied to the component at these two critical points, for example to one end journal 26 and to the middle journal 24. The two gauges 27, 28 are electrically interconnected so that when the diameter of the workpiece at one of the critical parts reaches the dimension at which the feed is to be changed to a fine feed, the feed is stopped until the second gauge also indicates that the second of the two parts of the component has reached its appropriate size, when commencement of the final fine feed is initiated. The circuit incorporates a timer which, if the second gauge does not indicate that the second part has reached its appropriate size within 10 seconds, causes the fine feed to be initiated, the second gauge being over-ridden.

It will be understood that the operation of contacts 27a, 28a in this manner ensures that any small discrepancy between the actual and theoretical diameters of the critical parts is removed or at least very much reduced before the final fine feed commences.

The gauges 27, 28 are further electrically interconnected so as to enable any one of the following four modes of automatic operation to be selected to be carried into effect when the workpiece comes to its finished size:

(1) The wheel head is automatically retracted when both of the gauges 27, 28 indicate that the diameter of the workpiece at the two critical parts respectively reach the correct finished dimensions.

(2) The forward feed of the wheel head is stopped when the diameter of the workpiece at one of the critical parts reaches the correct finished dimension, the wheel head being automatically retracted when the other gauge signals that the diameter of the workpiece at the other of the critical parts has reached the correct finished dimension.

(3) The feed is automatically stopped when the two gauges signal that the diameters of the workpiece at their respective critical parts have reached the correct respective finished dimensions, automatic retraction of the grinding head being initiated after a timed dwell in the range, for example of 0 to 10 seconds.

(4) The forward feed of the grinding head is automatically stopped when one gauge signals that the diameter of the workpiece at the associated critical part has reached the correct finished dimensions, the grinding head being retracted after a timed dwell in the range, for example of 0 to 10 seconds.

Figure 2:
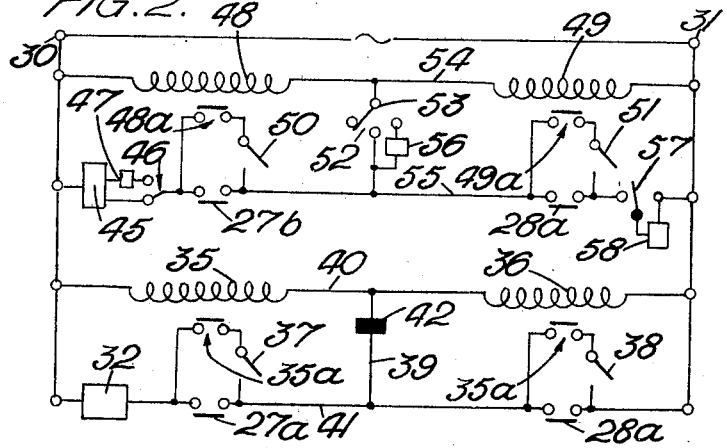
FIGURE 2 shows part of an electrical control circuit for controlling the grinding head movement.

FIGURE 2 shows the circuit diagram of an elementary electrical circuit for controlling the wheel head as described above.

Referring now to FIGURE 2, two sets of contacts 27a, 28a are respectively controlled by the gauges 27 and 28 and are connected in series with each other and with a device 32 for controlling the rate of feed of the wheel head across the supply terminals 30, 31. Two relays 35, 36, each set to operate after a predetermined delay period, say in the range 0 to 10 seconds, are connected in series with each other across the supply terminals 30, 31 and respectively close contacts 35a, 36a connected in by-pass circuits for the contacts 27a, 28a. The by-pass circuit for contacts 27a, also includes a switch 37, and the by-pass for contacts 28a includes a switch 38. A conductor 39 interconnects the line 40 between relays 35 and 36 and line 41 between contacts 27a, 28a, and a control mechanism 42 for stopping the forward feed of the wheel head is connected in conductor 39.

In operation of this part of the circuit, switches 37, 38 are normally closed. Contacts 27a, 28a are open when the wheel head is being moved forward at a semi-fine feed rate and are respectively bridged under the control of the gauges 27, 28 when the two critical parts of the workpiece reach their respective values at which the change from semi-fine to fine feed should occur. When contacts 27a, 28a are both closed the control device 32 causes the feed rate of the wheel head to be changed from a semi-fine rate to a fine rate. If one of the two parts reaches its predetermined diameter before the other, so that only one set of contacts, say contacts 27a, are closed, control mechanism 42 is actuated and stops the forward feed of the wheel head, and relay 36 operates after a predetermined time delay (in the range 0 to 10 seconds) to close contacts 36a to by-pass contacts 28a. Control device 32 is thus operated to initiate a fine feed movement of the wheel head if, before the end of the predetermined time delay contacts 28a have not been closed by the gauge 28 consequent upon the associated critical part of the workpiece reaching the predetermined diameter.

Two further sets of contacts 27b, 28b respectively operable by gauges 27 and 28 are connected in series with each other and a control device 45 across the supply terminals 30, 31. A switch 46 is provided to enable the line from contacts 27b to be connected to the control device 45 either directly or through a time delay device 47. A second switch 57 enables contacts 28b to be connected to terminal 31 either directly or through a control mechanism 58 for stopping the forward feed of the wheel head. Two relays 48, 49 each set to operate after a predetermined delay period, say in the range 0 to 10 seconds, are connected in series with each other across supply terminals 30, 31 and respectively close contacts 48a, 49a enabling contacts 27b, 28b respectively to be by-passed. Switches 50, 51 are respectively connected in circuit with contacts 48a and 49a to enable these contacts to be rendered inoperative if desired. A three-way switch 52 is disposed in a line 53 interconnecting the conductor 54 between relays 48 and 49 with the conductor 55 between the contacts 27b and 28b. In one position of switch 52 conductors 54 and 55 are interconnected through a control device 56. In the second position of switch 52 conductors 54 and 55 are connected directly to each other and in the third position of switch 52, line 53 is open.

If the apparatus is desired to operate in the manner described at 1 above, switches 50, 51 and 52 are opened and switch 46 is operated to connect the control device 45 directed to contacts 27b. Thus when gauges 27, 28 signal that the two critical parts of the workpiece have reached the correct finished diameters, contacts 27b and 28b are closed. When contacts 27b and 28b are both closed, control device 45 initiates retraction of the wheel head from the workpiece.

For the second of the above-mentioned modes of operation, switches 50 and 51 are left open, switch 52 is operated to place control device 56 in circuit between conductors 54 and 55, and switch 46 is operated to connect control device 45 directly to contacts 27b. When one or other of the critical parts of the workpiece reaches its finished diameter, either contacts 27b or 28b are closed and control device 56 is energized and initiates stopping of the forward feed of the wheel head. When the other gauge signals that the associated critical part of the workpiece has reached its correct finished diameter, the other contacts 27b or 28b are closed and control device 45 is actuated to initiate retraction of the wheel head.

For the third of the above-mentioned modes of operation of the device, switches 50 and 51 are opened, switch 46 is operated to bring delay device 47 into circuit with control device 45, and switch 57 is operated to place control mechanism 58 in series with contacts 27b, 28b. When both of the critical parts of the workpiece have reached their correct finished diameters, and contacts 27b, and 28b have thus been closed, control device 58 causes the forward feed of the wheel head to be stopped, and after a predetermined time delay by device 47, control device 45 initiates retraction of the wheel head.

For the fourth mode of operation, switches 50 and 51 are closed, switch 52 is operated to bring control mechanism 56 into circuit, switch 46 is operated to connect control device 45 directly to contacts 27b and switch 57 is connected to exclude control device 58. Thus when either contacts 27b or 28b are closed, signifying that one or other of the critical parts of the workpiece has reached its correct finished diameter, control device 56 causes the forward feed of the wheel head to be stopped. In addition, closure of contacts 27b or 28b respectively cause relays 49 or 48 to be energized to close contacts 48a or 49a after a predetermined delay period. Closure of contacts 48a or 49a then energizes control device 45 to initiate retraction of the wheel head.

The machine is set to operate in the manner most appropriate to each workpiece to be ground.

In conjunction with the operation of the wheel head, one or more steadies 33 are provided which are disposed at selected points along the length of the workpiece. Each steady includes two fingers each of which engages a surface of the workpiece concentric with the axis of rotation of the workpiece in the grinding machine and serves to support the workpiece against deflecting forces exerted by the grinding wheels. In the present instance, two steadies 33 (FIGURE 1) are provided and engage the second and fourth main journals of the crankshaft at points roughly opposite the respective grinding wheels during the semi-fine and fine feed operations. Each steady includes means operated at the point of changeover of the wheel head from coarse to fine feed, which means moves one of the fingers a very small distance nearer the axis of rotation of the workpiece on the grinding machine at the time of changeover from semi-fine to fine feed to compensate for the reduction in diameter of the part of the workpiece engaged by the finger during the coarse feed grinding.

Referring now to FIGURES 3, 4 and 5 of the drawing, each steady unit incorporates two contact fingers 70, 71. Finger 70 is disposed roughly opposite the point of contact of the grinding wheel with the workpiece and is movable forward at the changeover point in the manner described above. Finger 71 is mounted on a lever 72 which is pivotally mounted by a pin 73 on the fixed body 74 of the steady. Lever 72 is operated by a push rod 75 which projects slidingly from the body 74. Push rod 75 is screw threaded over the end portion of its length remote from lever 72, and an annular piston rod 76 surrounding rod 75 and screw threaded to rod 75 at 77 carries at its forward end a piston 78. This piston is slidably mounted in a cylinder 79 formed within the body 74. End pieces 80, 81 for cylinder 79 are secured to the body 74 and respectively provide bores 82, 83 in which rod 75 and piston rod 76 are slidingly mounted to project from the body 74. A knurled head 85 is secured by a pin 86 on the projecting end of the rod 75 remote from lever 72 to enable the axial position of the rod relative to piston 78 to be adjusted, and a lock nut 87 is engaged on the push rod 75 and abuts the end of piston rod 76 to enable the push rod and the piston rod to be locked together in selected positions of adjustment. The projecting end portion of piston rod 76 is encircled by a plate 88 which is prevented from rotating relative to the sleeve by a rod 89 slidably mounted in a bore in the body 74. Plate 88 is secured on the end of rod 89 by nuts 89a.

Finger 70 extends through a cylinder 91 formed above the cylinder 79 in the body 74. Cylinder 91 is closed at its two ends by end members 92, 93, and finger 70 is slidingly mounted at its forward end in a bore 94 in the end member 92. The rear end portion of finger 70 is of reduced diameter, and has rotatably mounted on it a sleeve 95 having a part 96 which is of reduced diameter and which is externally screw threaded. Sleeve 95 is axially located on finger 70 by the shoulder on the finger and by a knurled adjusting member 70a. A hollow piston rod 97 has one end in screwed engagement with the screwed portion 96 of sleeve 95 and has a piston 98 formed on its other end and disposed in cylinder 91. Sleeve 97 projects rearwards slidingly through a bore 99 in cylinder end member 93.

The body 74 is formed with a pressure fluid inlet passage 100 which has branch passages 101, 102 leading respectively to the forward ends of cylinders 79 and 91. Body 74 also provides a common exhaust duct 103 which communicates with the forward end of cylinder 91 directly and with the forward end of cylinder 79 through cylinder 91, branch duct 102, duct 100 and branch duct 101. Inlet and exhaust conduits for pressure fluid communicate through passages 105 and 106 with the rearward end of cylinders 79 and 91 respectively, but are not shown. Pistons 78, 98 are operated in unison. The supply of pressure fluid to the rearward ends of cylinders 79, 91, causes the two fingers to be moved simultaneously with each other into engagement with the workpiece, and the supply of pressure fluid to the forward ends of the cylinders causes the fingers to be withdrawn from the workpiece simultaneously with each other.

A mechanism 110 is mounted on the rearward ends of finger 70 and piston rod 97 for moving the rod nearer to the axis of rotation of the workpiece at the time of the change from coarse to fine feed. Mechanism 110 comprises a housing formed from a plate 111, axially extending portion 112 and cover 113 which are secured together, plate 111 being secured on the rearward end portion of piston rod 97. For this purpose piston rod 97 has a flat 97a thereon and plate 111 is made in two parts 111a and 111b, whereof part 111b, engages flat 97a. A rod 111c is secured to plate 111 and extends slidably into a bore in body 74 to prevent rotation of the housing of mechanism 110. A pin key 70b secured in finger 70 engages in a slot 97a in piston rod 97 to prevent rotation of finger 70. The piston rod is in turn prevented from rotating by its engagement with plate 111. An annular member 114 has a flange 115 which is secured on the rearward end of piston rod 97 and is held captive between member 112 and plate 111, and a bearing 116 is provided between the member 114 and an axial flange portion of an annular member 117 which is secured to the sleeve 95. A knurled adjusting member 70a is fixed to finger 70 and sleeve 95. Sleeve 95 is formed with integral keys 120 on which is engaged a ring 121. The radially outer parts of the ring are accommodated in a rebate in annular member 117 and a clamping ring 122 is disposed in a second rebate in the annular member 117 and its inner edge engages the outer edge of ring 121 to clamp the latter in its rebate in member 117. Piston rod 97, plate 111, member 112 and cover 113 are fixed against rotation.

A boss 125 (FIGURE 5) is secured to the outer face of annular member 117 opposite the bearing 116 and a small block 126 with arcuate lateral edges is secured on the boss by a screw 127 and pins 128 received in aligned holes in the block 126, boss 125 and member 117. The block is a close fit in a slot in a sliding socket member 130 which is formed integrally with a push rod 131 and which is backed by a slide member 123 secured to member 112 by screws 124. Push rod 131 projects through a bore 132 into a cylinder 133 in member 112 in which cylinder is disposed a double-acting piston 134, and the piston is secured on the push rod 131 by a nut 131a. The end wall of cylinder 133 remote from the push rod 131 is formed by a block 135 in which is formed a first combined inlet and exhaust passage 136 for pressure fluid to be supplied to one side of piston 134 and a second combined inlet and exhaust passage (not shown) for pressure fluid to be supplied to the opposite side of piston 134. Pressure fluid supplied through passage 136 to cylinder 133 causes the piston 134, and with it the push rod 131 to be moved to the right as it is shown in FIGURE 5, to rotate member 117 and hence finger 70. The supply of pressure fluid to cylinder 133 is initiated at the time of the change from semi-fine to fine feed of the wheel head and causes the finger 70 to be moved towards the axis of the workpiece a very small distance. The extent of movement of the sliding socket member 130 is controlled by a stop 140 which is externally screw threaded and which is mounted in a fixed internally-threaded barrel 141. A knurled thimble 142 is secured to the outer end of the stop 140 by a pin 143. A bracket 147 encircles thimble 142 and is located axially relative to the thimble by a circlip 148. A rod 149 fixed in body portion 112 extends between the ends of bracket 147, and a pinch bolt 150 extending through the ends of the bracket enables the thimble to be clamped in selected positions. Barrel 141 and thimble 142 are marked with graduations indicating the position of a stop 140, and provide an accurate measure of the travel of the socket 130 and hence of the forward movement of the finger 70. At the end of the grinding cycle piston 134 is operated to move block 126 back to its original position.

A cowl 145 is secured to the back plate 111 so as to move with the rear end portion of finger 70 and a similar cowl 146 is formed to extend round the rear end of rod 75.

In operation of the steady, the body 74 is positioned so that when pistons 78, 98 are moved to their forward extremities at the commencement of the semi-fine feed, the fingers 70, 71 exert a pressure on the surface of the workpiece which pressure reduces to zero when the engaged part of the workpiece is of the size appropriate to the change from semi-fine to fine feed. As the change to fine feed is made, finger 70 is moved toward the workpiece by operation of piston 134 the truing amount by which the engaged part of the workpiece is oversize on the radius, e.g. .0002".

I claim:

1. Machining apparatus comprising a plurality of cutting tools fixed in relation to each other, a workpiece support, feed means for moving the tools and support relatively towards and away from each other, said tools being spaced apart in a direction transversely to the direction of the feed movement, two gauge for respectively gauging two portions of a workpiece which portions are respectively to be machined by said tools, the gauge producing respective signals in response to the attainment of the portions to respective predetermined sizes, switch means actuatable by both of said gauges and adapted to stop the feed means when one of the gauges gives a signal on attainment of the portion measured thereby to its predetermined size, and thereafter to re-start the feed means to cause a forward feed movement, steady means for steadying the workpiece at or adjacent at least one of said portions, and means for automatically adjusting the steady means a preselected distance towards said portion or portions on actuation of the switch means by the gauge or gauges.

2. Machining apparatus as claimed in claim 1, wherein the steady means comprises a motor including co-acting piston and cylinder elements one of which elements is fixed and the other of which elements is movable towards and away from the workpiece support by fluid pressure applied within the cylinder element, a steadying finger mounted on said other element, and screw means interconnecting the finger and said other element for adjusting the position of the finger relative to the said other element in a direction towards and away from the workpiece.

3. Machining apparatus as claimed in claim 2, wherein automatic means for operating the screw means comprises a fixed cylinder, a piston mounted in the cylinder, and a socket member and a peg member connected one to the finger and the other to said other element, the construction and arrangement being such that pressure fluid supplied to the cylinder rotates the finger and said other element relative to each other.

4. Machining apparatus as claimed in claim 1, wherein the tools are rotary grinding wheels.

References Cited

UNITED STATES PATENTS

| | | | |
|---|---|---|---|
| 2,693,062 | 11/1954 | Silven et al. | 51—105 |
| 3,097,454 | 7/1963 | Pheil | 51—165 |
| 3,171,234 | 3/1965 | Hill | 51—105 |
| 3,233,368 | 2/1966 | Price | 51—238 X |
| 3,271,910 | 9/1966 | Haisch | 51—165 |

HAROLD D. WHITEHEAD, Primary Examiner

U.S. Cl. X.R.

51—238